Aug. 7, 1923.
W. M. INGRAM
JOINT
Filed Nov. 15, 1921
1,464,386
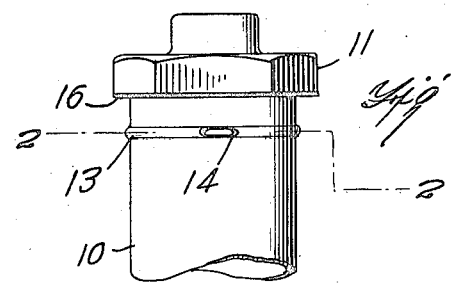
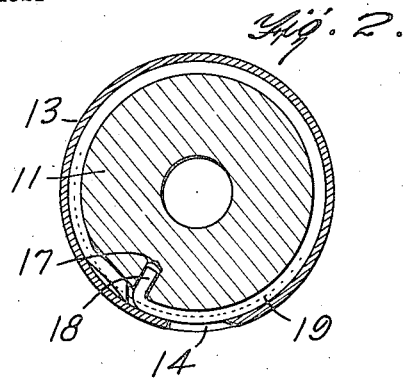
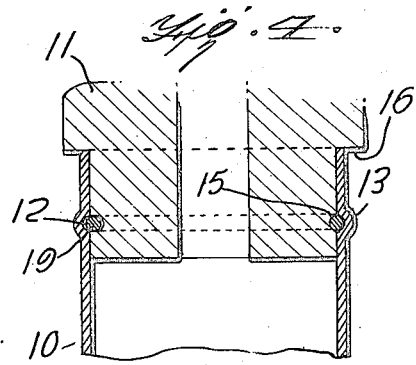
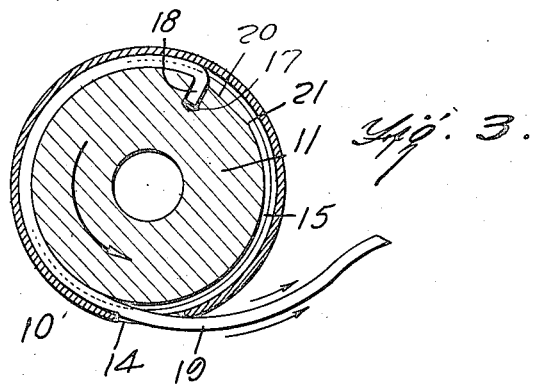
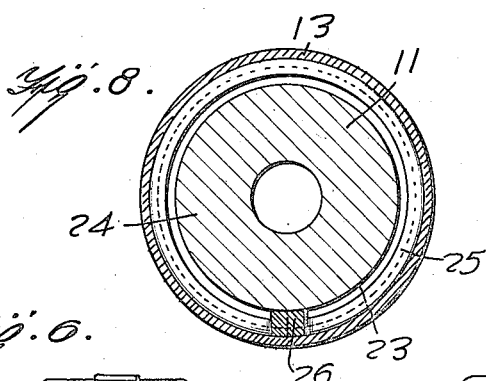
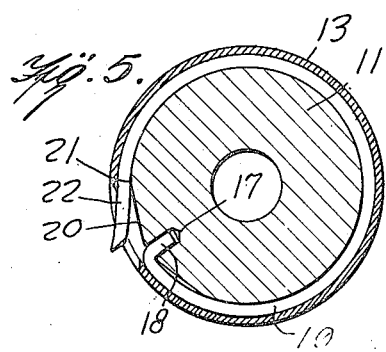
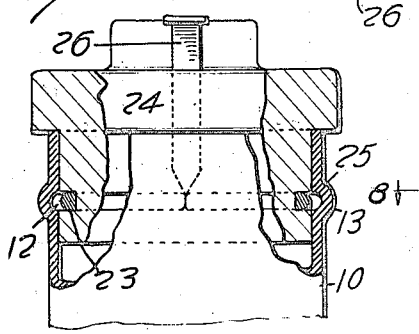
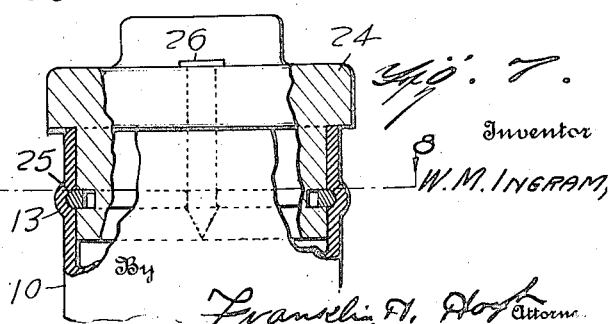
Inventor
W. M. INGRAM,
By
Franklin H. Hough Attorney Patented Aug. 7, 1923.

1,464,386

UNITED STATES PATENT OFFICE.

WALTER M. INGRAM, OF BALTIMORE, MARYLAND.

JOINT.

Application filed November 15, 1921. Serial No. 515,310.

*To all whom it may concern:*

Be it known that I, WALTER M. INGRAM, a citizen of the United States, residing at Baltimore, in the State of Maryland, have invented certain new and useful Improvements in Joints, of which the following is a specification, reference being had therein to the accompanying drawings.

This invention relates to joints and has for an object to provide a joint of improved type for joining a tubular member with an inclosed cylindrical member.

A further object of the invention is to provide a joint, including a tubular member and an inclosed cylindrical member fitting within said tubular member, with registering grooves with a wire extending about said grooves with improved means for disassociating the wire from its associated grooves.

A further object of the invention is to provide a joint for a tubular member and an inclosed cylindrical member, said joint comprising registering grooves formed in the contacting parts of the members of such proportion as to receive a wire about and within said grooves with improved means for insuring the movement of the end of said wire outwardly for the purpose of unlocking the parts.

With these and other objects in view, the invention comprises certain novel units, parts, combinations, functions and mechanical movements as will be hereinafter more fully described and claimed.

In the drawing:

Figure 1 is a view in side elevation of a tubular member showing in side elevation the joint associated therewith.

Figure 2 is a transverse sectional view through the joint on the plane indicated by line 2—2 of Figure 1.

Figure 3 is a view taken on the same plane as Figure 2 with the parts rotated to position to partly lock or partly unlock the joint.

Figure 4 is a longitudinal diametrical sectional view through the joint.

Figure 5 is a transverse sectional view through the joint with the parts in position to initiate the unlocking.

Figure 6 is a view partly in side elevation and partly in diametrical section of a modified type of joint.

Figure 7 is a view partly in side elevation and partly in diametrical section of the type of joint shown at Figure 6 with the parts moved to locking position.

Figure 8 is a transverse sectional view through the type of joint shown at Figures 6 and 7, shown in locking position as on line 8—8 of Figure 7.

Like characters of reference indicate corresponding parts throughout the several views.

The improved joint which forms the subject matter of this application is adapted to lock a pipe or tube 10 to a cylindrical member which will fit therein, which said cylindrical member may be the head indicated at 11 or, of course, any cylindrical member, tubular or otherwise which will fit within the tube 10. The tube 10 is provided with a groove 12, preferably formed by striking up a bead 13 at some position spaced a predetermined distance from the end of said tubular member.

The bead in the type of joint shown at Figures 1 to 5 inclusive is interrupted by being cut as indicated at 14 and the interior cylindrical member is provided with a groove 15 at such point as to register with the groove 12. This registry may be insured by providing the cylindrical member with a shoulder 16, although it is obvious, of course, that such shoulder is not essential to the invention. The cylindrical member is also provided with a substantially radial socket 17 into which the right angularly turned extremity 18 of the wire 19 is inserted. By inserting the right angular end 18 in the socket 17 when said socket is registering with the opening 14 and by turning the member 11, the wire 19 may be wound into the registering grooves 12 and 15.

Adjacent the socket 17, the groove 15 is cut upon a cord as indicated at 20, forming a fulcrum point 21 over which the end 22 of the wire will bend as indicated more particularly at Figure 2 and from which it will spring outwardly through the opening 14 as indicated at Figure 5 when the parts are brought into such registering position for the purpose of unlocking the parts.

It will, therefore, be apparent that starting with the members as shown at Figure 2 and rotating them relative to each other until the point 20 registers with the opening 14, it will spring outwardly over the fulcrum point 21 as shown at Figure 5 whereupon a continued unwinding in the direction indicated by the arrow at Figure 3 will serve to feed the wire out of the opening 14 so that, when the socket 17 again registers with the opening 14, the wire may be wholly removed from engagement with the parts and the parts themselves disassociated.

The type shown at Figures 6 to 8 inclusive comprises a groove 23 cut into the cylindrical member 24 of such depth that the wire 25 may be wholly contained therein, while the cylindrical member 24 is being inserted in the tube 10. A passage is provided from a wedge member 26 which is driven between the extremities of the wire 25, expanding such wire 25 to the position shown at Figures 7 and 8, that is to say expanded into the groove 12 and preventing thereby the removal of the part 24 therefrom. The wire 25 will preferably be composed of spring material, having a tendency to contract so that, when the wedge member 26 is withdrawn, the wire will automatically contract to clear the groove 12 and permit the removal of the head 24.

What I claim is:

1. A joint for a pipe and a contained cylindrical member comprising the formation in said pipe of an interior circumferential groove and in the cylindrical member an exterior groove registering with the groove of the pipe, said groove comprising a radial socket and a chordal portion adjacent said radial socket, the material of said pipe being cut through at one point permitting the insertion therethrough of the extremity of a wire to occupy the registering grooves and to bend downwardly over the chordal part of the groove in said cylindrical member.

2. A joint for a tube and a contained cylindrical member provided with registering circumferential grooves, said tube being cut through to give access to said groove, and the groove of the cylindrical member being formed at one point as the cord of a circle, and a wire wound within the groove and having an extremity bent downwardly over the angle formed by the part of said groove struck as a cord.

3. A joint comprising a cylindrical member having an exterior circumferential groove and a radial socket registering with said groove, said groove being struck upon a cord adjacent said socket, a tubular member having an internal groove positioned to register with the groove of the cylindrical member and being cut through to provide access from the exterior, and a wire having a right angular extremity proportioned to be inserted in said socket and wound into said registering groove by the rotation of the parts relative to each other with an extremity bent downwardly over the angle formed by the cord and adapted thereby to spring outwardly through the opening in the tubular member.

In testimony whereof I hereunto affix my signature in presence of two witnesses.

WALTER M. INGRAM.

Witnesses:
J. H. SHAILER,
A. R. FOWLER.